US011696135B2

(12) United States Patent
Liu et al.

(10) Patent No.: US 11,696,135 B2
(45) Date of Patent: Jul. 4, 2023

(54) MALICIOUS ANCHOR NODE DETECTION AND TARGET NODE LOCALIZATION METHOD BASED ON RECOVERY OF SPARSE TERMS

(71) Applicant: Sun Yat-sen University, Guangzhou (CN)

(72) Inventors: Xingcheng Liu, Guangzhou (CN); Zhao Tang, Guangzhou (CN); Yitong Liu, Guangzhou (CN)

(73) Assignee: Sun Yat-sen University, Guangzhou (CN)

( * ) Notice: Subject to any disclaimer, the term of this patent is extended or adjusted under 35 U.S.C. 154(b) by 13 days.

(21) Appl. No.: 17/566,738

(22) Filed: Dec. 31, 2021

(65) Prior Publication Data

US 2022/0312214 A1     Sep. 29, 2022

(30) Foreign Application Priority Data

Mar. 15, 2021   (CN) .......................... 202110289662.5

(51) Int. Cl.
  *H04W 12/121*  (2021.01)
  *H04W 12/00*  (2021.01)
  *G06F 17/17*  (2006.01)

(52) U.S. Cl.
  CPC .......... *H04W 12/121* (2021.01); *G06F 17/17* (2013.01); *H04W 12/009* (2019.01)

(58) Field of Classification Search
  CPC .... H04W 12/121; H04W 12/009; G06F 17/17
  USPC .......................................................... 726/23
  See application file for complete search history.

(56) References Cited

U.S. PATENT DOCUMENTS

| 8,693,597 | B2  | 4/2014 | Sexton et al. |
| 9,565,202 | B1* | 2/2017 | Kindlund ............. H04L 63/145 |
| 9,654,485 | B1* | 5/2017 | Neumann ........... H04L 63/1416 |
| 10,395,029 | B1 | 8/2019 | Steinberg |

(Continued)

OTHER PUBLICATIONS

Xingcheng Liu et. al., A Range-Based Secure Localization Algorithm for Wireless Sensor Networks, IEEE Sensors Journal, Jan. 15, 2019, pp. 785-796, vol. 19, Issue 2, IEEE, U.S.A.

(Continued)

*Primary Examiner* — Michael S McNally
(74) *Attorney, Agent, or Firm* — True Shepherd LLC; Andrew C. Cheng

(57) ABSTRACT

A malicious anchor node detection and target node localization method based on recovery of sparse terms, includes: S1: establishing an unknown disturbance term by using ranging value attack terms from an attacker to nodes in a wireless sensor network, and introducing a to-be-estimated location of a target node to the unknown disturbance term, to obtain an unknown sparse vector; S2: converting a problem of malicious anchor node detection and target node localization into a problem of recovery of the unknown sparse vector; S3: determining a location of an initial node according to a recursive weighted linear least square method, and recovering and reconstructing the unknown sparse vector with sparsity; and S4: determining a malicious anchor node determination range by approximating a threshold using a recovered value of the unknown sparse vector, to implement malicious anchor node detection, and recovering and determining location information of the target node.

10 Claims, 9 Drawing Sheets

(56) References Cited

U.S. PATENT DOCUMENTS 11,181,893 B2    11/2021   Cella et al.
2014/0351810 A1*  11/2014   Pratt .................. G06F 9/45545
                                                                                    718/1

OTHER PUBLICATIONS

Ravi Garg et. al., An Efficient Gradient Descent Approach to Secure Localization in Resource Constrained Wireless Sensor Networks, IEEE Transactions on Information Forensics and Security, Jan. 12, 2012, pp. 717-730, vol. 7, Issue 2, IEEE, U.S.A.

* cited by examiner

MALICIOUS ANCHOR NODE DETECTION AND TARGET NODE LOCALIZATION METHOD BASED ON RECOVERY OF SPARSE TERMS

CROSS-REFERENCE TO RELATED APPLICATIONS

This application claims priority to Chinese Patent Application No. 202110289662.5 with a filing date of Mar. 15, 2021. The content of the aforementioned application, including any intervening amendments thereto, is incorporated herein by reference.

TECHNICAL FIELD

The present disclosure relates to the technical field of wireless sensor networks, and in particular, to a malicious anchor node detection and target node localization method based on recovery of sparse terms.

BACKGROUND

The Internet of Things (IoT) is a vital research part of a new generation of information technology. It uses various devices capable of sensing information, such as radio frequency identification, global positioning, and infrared perception devices, to connect everything to the Internet in accordance with relevant protocols and conventions, to perform related information transmission and exchange, and identify, locate, track and monitor things, thus extending the Internet in the real environment, and realizing the interconnection network of all things without being restricted by time and space. In the IoT technology, the perception of things is an important part of fusing the physical reality environment with the world of information. It is the interactive connection of the information of things. Such perception is realized based on sensors and sensor networks.

A wireless sensor network (WSN) is based on the deployment of various nodes. A large number of nodes are deployed in an area to be detected and controlled, and the nodes are responsible for collecting information and obtaining their own localization information. However, in the initial stage of the network, such a large number of nodes are randomly deployed in the network area, and the location information of each node cannot be known in advance. In the subsequent networking process, based on the consideration of the vulnerability and cost of sensor nodes, it is difficult to install GPS devices on a large number of nodes in a large-scale networking system. Therefore, it is necessary to propose and develop related localization mechanisms in the wireless sensor network to achieve real-time and precise localization of a large number of nodes. In addition, deployment environments of the wireless sensor network are mostly harsh and unstable with sudden and unknown factors, and lack manual monitoring. The localization in the system is prone to various malicious attacks, causing a failure of the localization mechanism of the sensor network, and correct localization cannot be achieved.

Malicious attacks are divided into two categories: internal attacks and external attacks. An internal attack means capturing a sensor node in the network, injecting malicious code into the protocol, and then tampering with relevant data of the network node, such that the node fails to achieve the sensing mechanism function normally and becomes a malicious anchor node. An external attack directly targets network functions and interferes with node localization. When a node is in an attack environment and becomes a malicious anchor node, the node will directly provide its own error location information, or provide error measured distance information between the anchor node and an unknown node required in the localization mechanism. However, no matter which method or mechanism is used, it will cause a large error in the localization of the unknown node in the localization mechanism, resulting in a failure of the localization mechanism.

Some existing representative methods for malicious anchor node detection are introduced below:

Malicious anchor nodes Detection using Clustering and Consistency (MNDC) [1] X. Liu, S. Su, F. Han, Y. Liu and Z. Pan, "A Range-Based Secure Localization Algorithm for Wireless Sensor Networks," in IEEE Sensors Journal, vol. 19, no. 2, pp. 785-796, 15 Jan. 15, 2019. The MNDC algorithm is based on the consistency of the information obtained by the two ranging modes of RSSI and TOA, and adopts a clustering algorithm to detect and screen nodes. However, this algorithm requires accurate RSSI results in the two ranging modes. However, in the actual wireless sensor network, the RSSI ranging mode is extremely vulnerable to attacks.

Malicious Anchor Node Detection Based on Isolation Forest (MANDIF) [2] Liu, X.,et al.: A Malicious Anchor Detection Algorithm Based on Isolation Forest and Sequential Probability Ratio Testing (SPRT), 2019. The MANDIF algorithm uses the isolated forest algorithm to screen malicious anchor nodes to obtain preliminary localization information, compares the preliminary localization information with ranging information of a node to be tested in the network to obtain a measurement error, determines an error range, and then screens the malicious anchor nodes in the error range by using a sequential ratio testing method. This algorithm separates the malicious anchor node detection from the localization of the final target node. In the first stage, the malicious anchor node is detected and the preliminary localization result is obtained, and in the second stage, the error reference range is determined by using the preliminary localization result, and then the remaining nodes are screened. This algorithm has good performance for the screening of malicious anchor nodes, but is too redundant and cumbersome; the initial localization and re-screening will cause accumulation of errors.

GD [3] R. Garg, A. L. Varna and M. Wu, "An Efficient Gradient Descent Approach to Secure Localization in Resource Constrained Wireless Sensor Networks," in *IEEE Transactions on Information Forensics and Security*, vol. 7, no. 2, pp. 717-730, April 2012. This algorithm combines the iterative gradient descent algorithm with selective deletion and pruning of inconsistent measurements; the malicious anchor nodes have a large gradient, and by setting a gradient threshold, nodes that reach the gradient threshold are discarded, and nodes below the threshold are retained for iterative localization.

WLS is a tolerance-based localization algorithm. To solve the problem that a malicious anchor node in the RSSI ranging mode affects localization by maliciously tampering with the reference power in the RSSI, this algorithm, on the basis of the traditional trilateral localization, analyzes and processes ranging information of each node, and changes a contribution value of the node to an unknown node localization value by changing a weight value. However, the accuracy of the WLS algorithm for node localization is not ideal in the case of high malicious attack intensity, and it is not suitable for coordinated attacks.

SUMMARY

In order to solve the problem in the prior art that localization of an unknown node needs to rely on selection of an anchor node, which results in an increased error of the subsequent localization and detection rate, the present disclosure provides a malicious anchor node detection and target node localization method based on recovery of sparse terms, which implements malicious anchor node detection and estimation of unknown node localization simultaneously in a secure localization mechanism, thereby improving the accuracy and efficiency of the detection.

To solve the foregoing technical problem, the technical solution of the present disclosure is as follows: a malicious anchor node detection and target node localization method based on recovery of sparse terms, including the following steps:

S1: establishing an unknown disturbance term by using ranging value attack terms from an attacker to nodes in a wireless sensor network, and introducing a to-be-estimated location of a target node to the unknown disturbance term, to obtain an unknown sparse vector;

S2: converting a problem of malicious anchor node detection and target node localization into a problem of recovery of the unknown sparse vector;

S3: determining a location of an initial node according to a recursive weighted linear least square method, and recovering and reconstructing the unknown sparse vector with sparsity by using a self-adaptive gradient projection method; and S4: determining a malicious anchor node determination range by approximating a threshold using a recovered value of the unknown sparse vector, to implement malicious anchor node detection, and recovering and determining location information of the target node by using a non-sparse part reconstructed from an interference term.

Preferably, according to a wireless sensor distribution model, in a network environment in which the sensor network is deployed, a location information set $\{A_1, A_2 \ldots A_n\}$ of anchor nodes in the network is set, and a node is randomly set as a target anchor node, where a location of the target anchor node is $t=[t_x, t_y]$, and a real distance between an i-th anchor node and the target node is $\|A_i-t\|$, $i=1, 2 \ldots n$; therefore, a measured distance di between the i-th anchor node and the target node is expressed as follows:

$$d_i = \|A_i - t\| + n_i + u_i, i = 1, 2 \ldots n \quad (1)$$

wherein $n_i$ represents noise in a measurement process, which is a Gaussian random variable having an independent distribution with a mean of 0; $u_i$ represents the unknown disturbance term, which is represented by a Gaussian random variable having an independent distribution and is expressed as follows:

$$u_i \sim N(\mu_{att}, \sigma_{att}^2)$$

wherein $i=1,2,\ldots n$ represents the i-th node; $\mu_{att}$ represents a mean, $\sigma_{att}^2$ represents a variance, and if the i-th node is a malicious anchor node; $u_i$ is a non-zero value, otherwise, $u_i$ is zero or close to zero.

Further, the unknown sparse vector is expressed as follows:

$$p = [u_1, u_2, \ldots u_n, t_x, t_y]$$

wherein $u_i$ represents the unknown disturbance term, $i=1, 2, \ldots, n$; $t=[t_x, t_y]$ and represents the to-be-estimated location of the target node.

Further, step S2 of converting a problem of malicious anchor node detection and target node localization into a problem of recovery of the sparse vector is expressed as follows:

$$\hat{p} = \operatorname*{argmin}_{p} G(P) = \operatorname{argmin} \sum (d_i - \|A - t\|_2 + u_i)^2 + \lambda \|u\|_1 \quad (2)$$

wherein $d_i$ represents an estimated distance value of a malicious anchor node when there is a measurement error; A represents a coefficient matrix, A represents a regular factor, and u represents an attack term.

Further, because the recovery and reconstruction of the unknown sparse vector rely on the location of the initial node, a signal energy receiving model is established according to a signal energy loss and a distance relationship between a transmitting end and a receiving end, and a linear system model is established according to the signal energy receiving model and solved by using a recursive weighted linear least square method, thereby determining the location of the initial node.

Further, the signal energy receiving model is expressed as follows:

$$P_R = P_{Ti} - 10a\log\frac{d_i}{d_o} + \varepsilon_i \quad (3)$$

wherein $P_R$ represents signal energy received by an i-th receiving end from the target anchor node; $P_{Ti}$ represents initial signal energy sent by an i-th transmitting end, $d_i$ is a measured distance between an i-th anchor node and the target node, $d_0$ is a reference distance, and $\varepsilon_i$ is a measurement error; formula (2) is converted into the following form:

$$z_i = 10^{y_i}, i = 1, 2, \ldots n \quad (4)$$

wherein $$z_i = 10^{\frac{P_{Ti}-P_R}{10a}}, y_i = \log d_i + \frac{\varepsilon_i}{5a};$$

$\alpha$ represents a channel attenuation coefficient;

after unscented transformation (UT) and mathematical operations, a mean and a variance of $Z_i$ are obtained approximately:

$$\bar{Z}_i \approx \alpha_i \|A_i - T\|^2 \quad (5)$$

$$\sigma_{z_i}^2 = \beta_i \|A_i - T\|^2 \quad (6)$$

wherein, $$\alpha_i = \frac{2}{3} + \frac{1}{6} 10^{\frac{\sqrt{3}\sigma_i^2}{5a}} + \frac{1}{6} 10^{-\frac{\sqrt{3}\sigma_i^2}{5a}};$$

$$\beta_i = \frac{2}{3}(1-\alpha_i)^2 + \frac{1}{6}\left(10^{\frac{\sqrt{3}\sigma_i^2}{5a}} - \alpha_i\right)^2 + \frac{1}{6}\left(10^{-\frac{\sqrt{3}\sigma_i^2}{5a}} - \alpha_i\right)^2,$$

and $\sigma_i^2$ represents a variance of $u_i$.

Further, the established linear system model is expressed as follows:

$$b = At + w \quad (7)$$

wherein $t=[t_x, t_y]$ represents the to-be-estimated location of the target node, w is a noise vector, $w=[w_1, w_2 \ldots w_n]^T$, and $w_i$ represents Gaussian white noise with a mean of 0; i=1, 2 ... n;
b represents an observation vector:

$$b = [b_1, b_2, \ldots b_n]^T = \begin{bmatrix} \frac{z_1}{\alpha_1} - \frac{z_r}{\alpha_r} + (x_r^2 + y_r^2) - (x_1^2 + y_1^2) \\ \frac{z_2}{\alpha_2} - \frac{z_r}{\alpha_r} + (x_r^2 + y_r^2) - (x_2^2 + y_2^2) \\ \ldots \\ \frac{z_n}{\alpha_n} - \frac{z_r}{\alpha_r} + (x_r^2 + y_r^2) - (x_n^2 + y_n^2) \end{bmatrix} \quad (8)$$

wherein $(x_r, y_r)$ represents location information of a r-th anchor node, and the r-th anchor node is selected as a reference anchor node;
A represents a coefficient matrix, $$A = 2 \begin{bmatrix} x_r - x_1 & y_r - y_1 \\ x_r - x_2 & y_r - y_2 \\ \vdots & \vdots \\ x_r - x_n & y_r - y_n \end{bmatrix} \quad (9)$$

then a weighted linear least square equation and a corresponding solution are expressed as follows:

$$f(t) = (b - At)^T * c(t)^{-1} * (b - At) \quad (10)$$

$$\hat{t} = [A^T c(\hat{t})^{-1} A]^{-1} A^T c(\hat{t})^{-1} b \quad (11)$$

Further, to achieve higher computing accuracy, a backtracking equation is acquired through iterative solutions, $$\hat{t}^k = [A^T c(\hat{t})^{-1} A]^{-1} A^T c(\hat{t}^{k-1})^{-1} b \quad (12)$$

wherein an iteration ending condition is: $\|\hat{t}^k - \hat{t}^{k+1}\| \leq \gamma$, and $\gamma$ represents a threshold of a Euclidean distance between location information of the k-th iteration result and location information of the (k+1)-th iteration result, and is set manually.

Further, the unknown sparse vector is recovered by using the self-adaptive gradient projection method, two positive vectors $\phi = [\phi_1, \phi_2, \ldots, \phi_n]^T$ and $\tau = [\phi^T, \psi^T, t^T]^T$ are introduced first to divide the unknown sparse vector into a positive part and a negative part, thereby dividing G(P) into a loss function and a regular function;
$\tau = [\phi^T, \psi^T, t^T]^T$ is redefined in the recovery process, and then formula (2) is converted into the following form:

$$\hat{p} = \arg\min_p G(P) = \arg\min_p \sum (d_i - \|A - t\|_2 + u_i)^2 + \lambda 1_N^T (\phi + \psi) \quad (13)$$

wherein $P = [u_1, u_2 \ldots u_n, t_x, t_y]$;
an iterative formula is as follows:

$$\begin{cases} v^k = P(\tau^k - \alpha^k \nabla G(\tau^k)) \\ \tau^{k+1} = \tau^k + \lambda^k (v^k - \tau^k) \end{cases} \quad (14)$$

wherein in formula (14), $\tau^k$ is the k-th iteration result of $\tau = [\phi^T, \psi^T, t^T]^T$; $\alpha^k$ represents an adaptive step; $\lambda^k$ represents a positive scalar; P( ) is used to represent a projection operation for vector z.
Further, iterations are performed on iterative formula (14) according to an Armijo rule, that is, all values of k are set to 1 by using $\lambda^k$, and then $\alpha^k$ is continuously reduced until an Armijo-like inequation is satisfied, where the Armijo-like inequation is expressed as follows:

$$G(P(\tau^k - \alpha^k \nabla G(\tau^k))) \leq \mu \nabla G(\tau^k)^T (\tau^k - P(\tau^k - \alpha^k \nabla G(\tau^k))) \quad (15)$$

wherein $\beta \in (0, 0.5)$, $\alpha \in (1, 2)$, and after a value of the adaptive step is fixed, $\tau^k = P(\tau^k - \alpha^k \nabla G(\tau^k))$ is determined.

Compared with the prior art, the technical solutions of the present disclosure have the following beneficial effects:
In view of the interference from a malicious anchor node to ranging information, the present disclosure provides a method that can achieve both the function of screening and detection of malicious anchor nodes and the function of target node localization. Compared with the conventional localization method, the present disclosure not only considers attacks on the sensor network and the presence of malicious anchor node, but also greatly reduces the time complexity. The malicious anchor node detection and target node localization method in the present disclosure ensures the accuracy and efficiency of the detection.

DETAILED DESCRIPTION OF THE EMBODIMENTS

The technical solutions of the embodiments of the present disclosure are clearly and completely described below with reference to the accompanying drawings. Apparently, the described embodiments are merely some of rather than all of the embodiments of the present disclosure, and are only for illustrative description but should not be construed as a limitation to the present patent. All other embodiments obtained by a person of ordinary skill in the art based on the embodiments of the disclosure without creative efforts shall fall within the protection scope of the present disclosure.
The following further describes the technical solution of the present disclosure in detail with reference to the accompanying drawings and embodiments.

Embodiment 1

Figure 1:
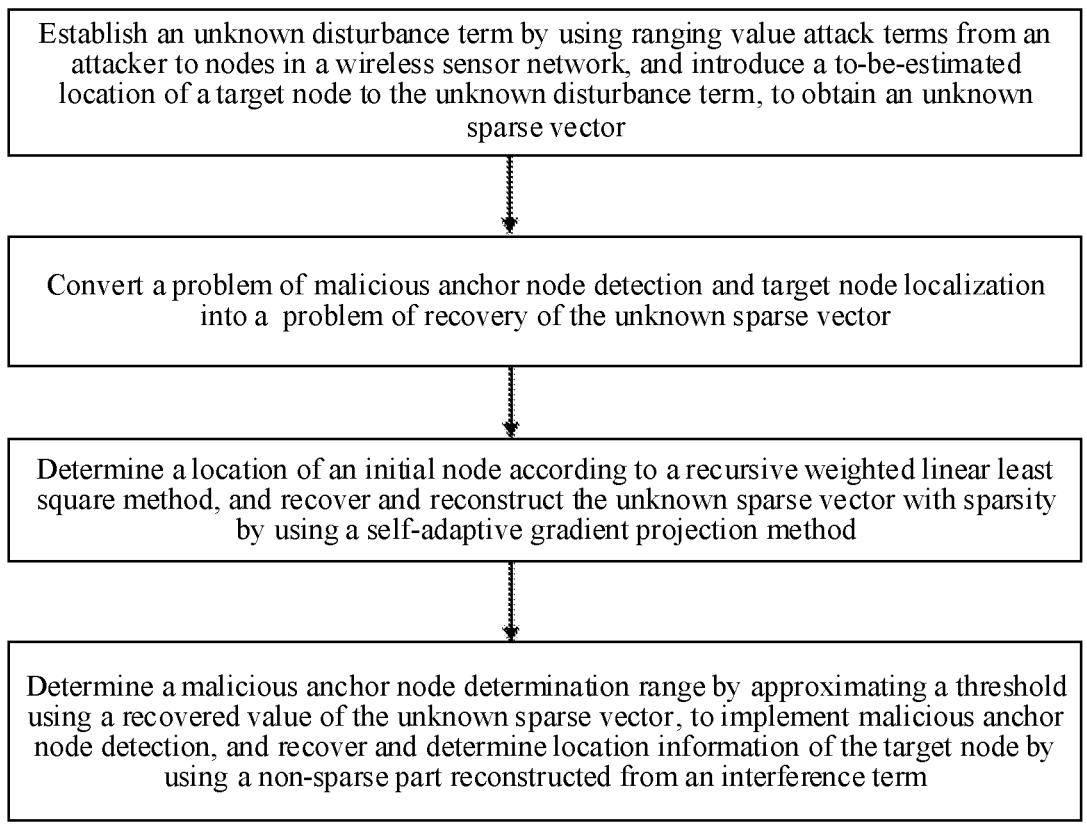
FIG. 1 is a flowchart of a method according to an embodiment.

As shown in FIG. 1, a malicious anchor node detection and target node localization method based on recovery of sparse terms is provided, including the following steps:
S1: Establish an unknown disturbance term by using ranging value attack terms from an attacker to nodes in a wireless sensor network, and introduce a to-be-estimated location of a target node to the unknown disturbance term, to obtain an unknown sparse vector.

S2: Convert a problem of malicious anchor node detection and target node localization into a problem of recovery of the unknown sparse vector.

S3: Determine a location of an initial node according to a recursive weighted linear least square method, and recover and reconstruct the unknown sparse vector with sparsity by using a self-adaptive gradient projection method.

S4: Determine a malicious anchor node determination range by approximating a threshold using a recovered value of the unknown sparse vector, to implement malicious anchor node detection, and recover and determine location information of the target node by using a non-sparse part reconstructed from an interference term.

In a specific embodiment, in step S1, specifically, according to a wireless sensor distribution model, in a network environment in which the sensor network is deployed, a location information set $\{A_1, A_2 \ldots A_n\}$ of anchor nodes in the network is set. For ease of description, a node is randomly set as a target anchor node, where a location of the target anchor node is $t=[t_x, t_y]$. A real distance between the i-th anchor node and the target node can be recorded as $\|A_i-t\|$, $i=1, 2 \ldots n$. Therefore, a measured distance $di$ between the i-th anchor node and the target node is expressed as follows:

$$d_i = \|A_i - t\| + n_i + u_i, i=1,2 \ldots n \quad (1)$$

wherein $n_i$ represents noise in a measurement process, which is a Gaussian random variable having an independent distribution with a mean of 0; $u_i$ represents the unknown disturbance term, which is represented by a Gaussian random variable having an independent distribution and is expressed as follows:

$$u_i \sim N(\mu_{att}, \sigma_{att}^2)$$

wherein $i=1,2, \ldots n$ represents the i-th node; represents a mean, $\sigma_{att}^2$ represents a variance, and if the i-th node is a malicious anchor node, $u_i$ is a non-zero value; otherwise, the value is zero or close to zero.

$u_i$ in ranging information of all the anchor nodes is used to construct a new vector, where $U=\{u_i, u_2 \ldots u_i\}$; when some anchor nodes in the wireless sensor network are subject to external attacks and become malicious anchor nodes, within a certain range, it is ensured that the constructed vector is sparse. Screening of malicious anchor nodes can be converted into recovery of the unknown sparse vector and the screening and discrimination of non-zero values.

The unknown disturbance item $u_i$, $i=1, 2 \ldots n$ and the to-be-estimated location of the target node $t=[t_x, t_y]$ can be re-combined, to obtain an unknown sparse vector to be solved. The unknown sparse vector is expressed as follows:

$$p=[u_1, u_2, \ldots u_n, t_x, t_y]$$

wherein $u_i$ represents the unknown disturbance term, $i=1, 2, \ldots, n$; $t=[t_x, t_y]$ represents the to-be-estimated location of the target node.

In a specific embodiment, step S2 of converting a problem of malicious anchor node detection and target node localization into a problem of recovery of the sparse vector is expressed as follows:

$$\hat{p} = \arg\min_p G(P) = \arg\min \sum (d_i - \|A - t\|_2 + u_i)^2 + \lambda \|u\|_1 \quad (2)$$

wherein $d_i$ represents a measured distance between the i-th anchor node and the target node; A represents a coefficient matrix, $\lambda$ represents a regular factor, and u represents an attack term.

In a specific embodiment, in step S3, because the recovery and reconstruction of the unknown sparse vector rely on the location of the initial node, a signal energy receiving model is established according to a signal energy loss and a distance relationship between a transmitting end and a receiving end, and a linear system model is established according to the signal energy receiving model and solved by using a recursive weighted linear least square method, thereby determining the location of the initial node.

Specifically, the signal energy receiving model is expressed as follows:

$$P_R = P_{Ti} - 10a\log\frac{d_i}{d_o} + \varepsilon_i \quad (3)$$

wherein $P_R$ represents signal energy received by the i-th receiving end from the target anchor node; $P_{Ti}$ represents initial signal energy sent by the i-th transmitting end, $d_i$ is a measured distance between the i-th anchor node and the target node, $d_0$ is a reference distance, and $\varepsilon_i$ is a measurement error, which is a Gaussian variable having a mean of 0 and a variance of $\sigma^2$.

formula (2) is converted into the following form:

$$z_i = 10^{y_i}, i=1,2, \ldots n \quad (4)$$

wherein $$z_i = 10^{\frac{P_{Ti}-P_R}{10a}}, y_i = \log d_i + \frac{\varepsilon_i}{5a};$$

$\alpha$ represents a channel attenuation coefficient;

after UT and mathematical operations, a mean and a variance of $Z_i$ are obtained approximately:

$$\bar{Z}_i \approx \alpha_i \|A_i - T\|^2 \quad (5)$$

$$\sigma_{z_i}^2 = \beta_i \|A_i - T\|^2 \quad (6)$$

wherein, $$\alpha_i = \frac{2}{3} + \frac{1}{6} 10^{\frac{\sqrt{3}\sigma_i^2}{5a}} + \frac{1}{6} 10^{-\frac{\sqrt{3}\sigma_i^2}{5a}};$$

$$\beta_i = \frac{2}{3}(1-\alpha_i)^2 + \left(10^{\frac{\sqrt{3}\sigma_i^2}{5a}} - \alpha_i\right)^2 + \frac{1}{6}\left(10^{-\frac{\sqrt{3}\sigma_i^2}{5a}} - \alpha_i\right)^2,$$

$\sigma_i^2$ represents a variance of $u_i$.

The established linear system model is expressed as follows:

$$b = At + w \quad (7)$$

wherein $t=[t_x, t_y]$ represents the to-be-estimated location of the target node; w is a noise vector, $w=[w_1, w_2 \ldots w_n]^T$, and $w_i$ represents Gaussian white noise with a mean of 0; $i=1, 2 \ldots n$;

b represents an observation vector:

$$b = [b_1, b_2, \ldots b_n]^T = \begin{bmatrix} \frac{z_1}{\alpha_1} - \frac{z_r}{\alpha_r} + (x_r^2 + y_r^2) - (x_1^2 + y_1^2) \\ \frac{z_2}{\alpha_2} - \frac{z_r}{\alpha_r} + (x_r^2 + y_r^2) - (x_2^2 + y_2^2) \\ \ldots \\ \frac{z_n}{\alpha_n} - \frac{z_r}{\alpha_r} + (x_r^2 + y_r^2) - (x_n^2 + y_n^2) \end{bmatrix} \quad (8)$$

wherein $(x_r, y_r)$ represents location information of the r-th anchor node, and the r-th anchor node is selected as a reference anchor node; A represents a coefficient matrix, $$A = 2\begin{bmatrix} x_r - x_1 & y_r - y_1 \\ x_r - x_2 & y_r - y_2 \\ \vdots & \vdots \\ x_r - x_n & y_r - y_n \end{bmatrix} \quad (9)$$

then a weighted linear least square equation and a corresponding solution are expressed as follows:

$$f(t) = (b - At)^T * c(t)^{-1} * (b - At) \quad (10)$$

$$\hat{t} = [A^T c(\hat{t})^{-1} A]^{-1} A^T c(\hat{t})^{-1} b \quad (11).$$

Further, to achieve higher computing accuracy, a backtracking equation is acquired through iterative solutions, $$\hat{t}^k = [A^T c(\hat{t})^{-1} A]^{-1} A^T c(\hat{t}^{k-1})^{-1} b \quad (12)$$

wherein an iteration ending condition is: $\|\hat{t}^k - \hat{t}^{k+1}\| \leq \gamma$, and $\gamma$ represents a threshold of a Euclidean distance between location information of the k-th iteration result and location information of the (k+1)-th iteration result, and is set manually.

In a specific embodiments, the unknown sparse vector is recovered by using the self-adaptive gradient projection method, two positive vectors $\phi = \phi = [\phi_1, \phi_2, \ldots, \phi_n]^T$ and $\tau = [\phi^T, \psi^T, t^T]^T$ are introduced first to divide the unknown sparse vector into a positive part and a negative part, thereby dividing G(P) into a loss function and a regular function; $\tau = [\phi^T, \psi^T, t^T]^T$ is redefined in the recovery process, and then formula (2) is converted into the following form:

$$\hat{p} = \operatorname*{argmin}_{p} G(P) = \operatorname*{argmin}_{p} \sum (d_i - \|A - t\|_2 + u_i)^2 + \lambda 1_N^T (\phi + \psi) \quad (13)$$

wherein $P = [u_1, u_2 \ldots u_n, t_x, t_y]$;
an iterative formula is as follows:

$$\begin{cases} v^k = P(\tau^k - \alpha^k \nabla G(\tau^k)) \\ \tau^{k+1} = \tau^k + \lambda^k (v^k - \tau^k) \end{cases} \quad (14)$$

wherein in formula (14), $\tau^k$ is the k-th iteration result of $\tau = [\phi^T, \psi^T, t^T]^T$; $\alpha^k$ represents an adaptive step; $\lambda^k$ represents a positive scalar; P( ) is used to represent a projection operation for vector z, which is specifically an operation of projecting vector z to a corresponding non-negative positive quadrant.

In a specific embodiment, the self-adaptive gradient projection method has multiple step selection methods. There are different selection rules for step selection. Because the iterations of the unknown sparse vector are more likely to be converged on the boundary, in this embodiment, iterations are performed on iterative formula (14) by using an Armijo rule, that is, all values of k are set to 1 by using λk, and $\alpha^k$ is reduced continuously until an Armijo-like inequation is satisfied. The Armijo-like inequation is expressed as follows:

$$G(P(\tau^k - \alpha^k \nabla G(\tau^k))) \leq \mu \nabla G(\tau^k)^T (\tau^k - P(\tau^k - \alpha^k \nabla G(\tau^k))) \quad (15)$$

wherein $\beta \in (0, 0.5)$, $\alpha \in (1, 2)$, and after a value of the adaptive step is fixed, $\tau^k = P(\tau^k - \alpha^k \nabla G(\tau^k))$ is determined.

Through the foregoing steps, a malicious anchor node determination range is determined, to implement malicious anchor node detection, and the location information of the target node is recovered and determined by using the non-sparse part reconstructed from the interference term. That is, the last two items in the recovered unknown sparse vector are location coordinates of the target node.

Compared with the conventional localization method, this embodiment not only considers attacks on the sensor network and the presence of malicious anchor node, but also greatly reduces the time complexity. The method of this embodiment performs malicious anchor node detection and target node localization simultaneously, thereby effectively ensuring the accuracy and efficiency of the detection.

To effectively evaluate the performance of the method in this embodiment, four evaluation metrics are introduced in this embodiment.

1. TPR (true positive rate, which is a ratio of the number of correctly detected malicious anchor nodes to the total number of malicious anchor nodes)

2. FPR (false positive rate, a ratio of the number of benign anchor nodes wrongly detected as malicious anchor nodes to the total number of benign anchor nodes)

3. FNR (false negative rate, a ratio of the number of malicious anchor nodes wrongly detected as benign anchor nodes to the number of benign anchor nodes)

4. Average localization error.

Moreover, comparisons were made with other algorithms, including malicious anchor node detection based on isolation forest (MANDIF), which uses isolation forest and sequential probability ratio testing to detect malicious anchor nodes; malicious anchor node detection based on clustering and consistency (MNDC) and enhanced malicious anchor node detection based on clustering and consistency (EMDC); and the GD algorithm with fixed and variable steps proposed by Ravi-Garg et al. Computer configuration of the experimental environment: CPU: core (TM) i7-8700; memory: 32G; operating system: Windows 10. All simulation and comparison experiments were performed in a simulated experimental environment on Matalb2019a. m anchors containing n malicious anchors were deployed in a 100 m×100 m square and in the same field, and the following experiments were performed more than 1000 times to obtain accurate and stable results.

Figure 2:
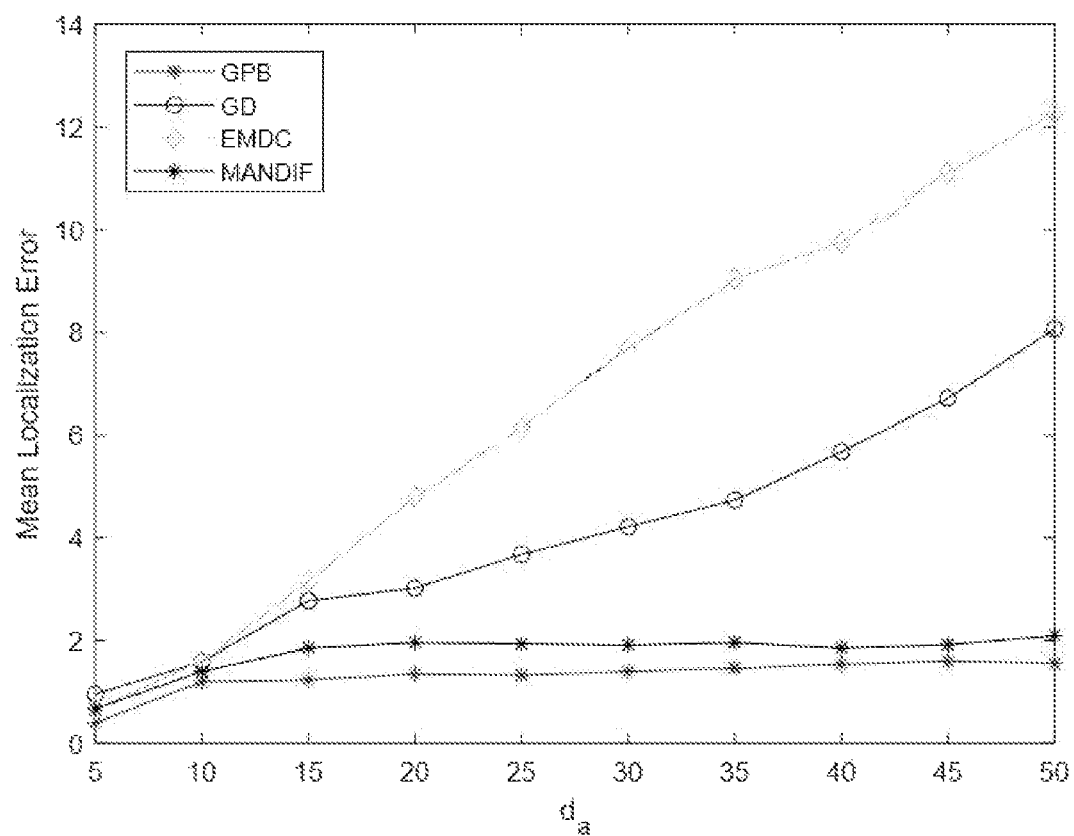
FIG. 2 shows curves of MLE (Mean Localization Error) vs. attack term standard deviation according to an embodiment.

In Experiment 1, a relatively simple environment was set up. The MLE is shown in FIG. 2 as $d_a$ varies from 5 to 50. From FIG. 2, it can be seen that while the performance of EMDC and GD decreases as $d_a$ increases, the performance of MANDIF and GPB algorithms is stable. By analyzing the data, in the value range of $d_a$, the maximum estimated mean values of EMDC, GD, MANDIF and GPB are 6.623, 3.948, 1.914, and 1.308, respectively; the localization error is reduced significantly: the reduction is 80.3%, 66.9% and 31.7% compared to EMDC, GD and MANDIF algorithms, respectively.

Figure 3:
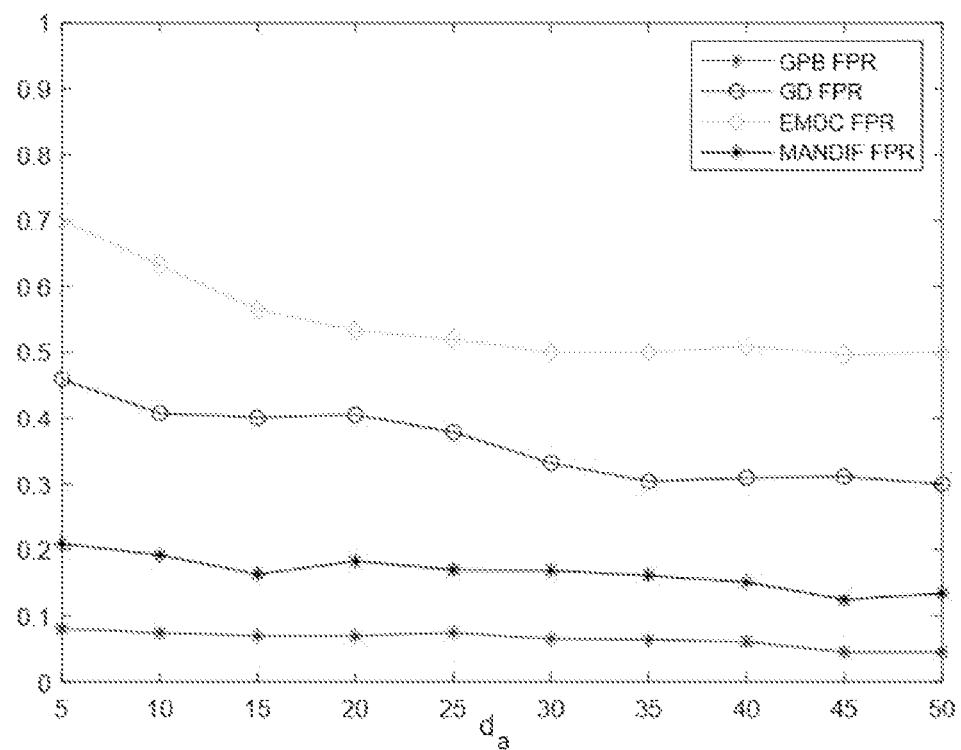
FIG. 3 shows curves of FNR (False Negative Rate) vs. attack term standard deviation according to an embodiment.
Figure 4:
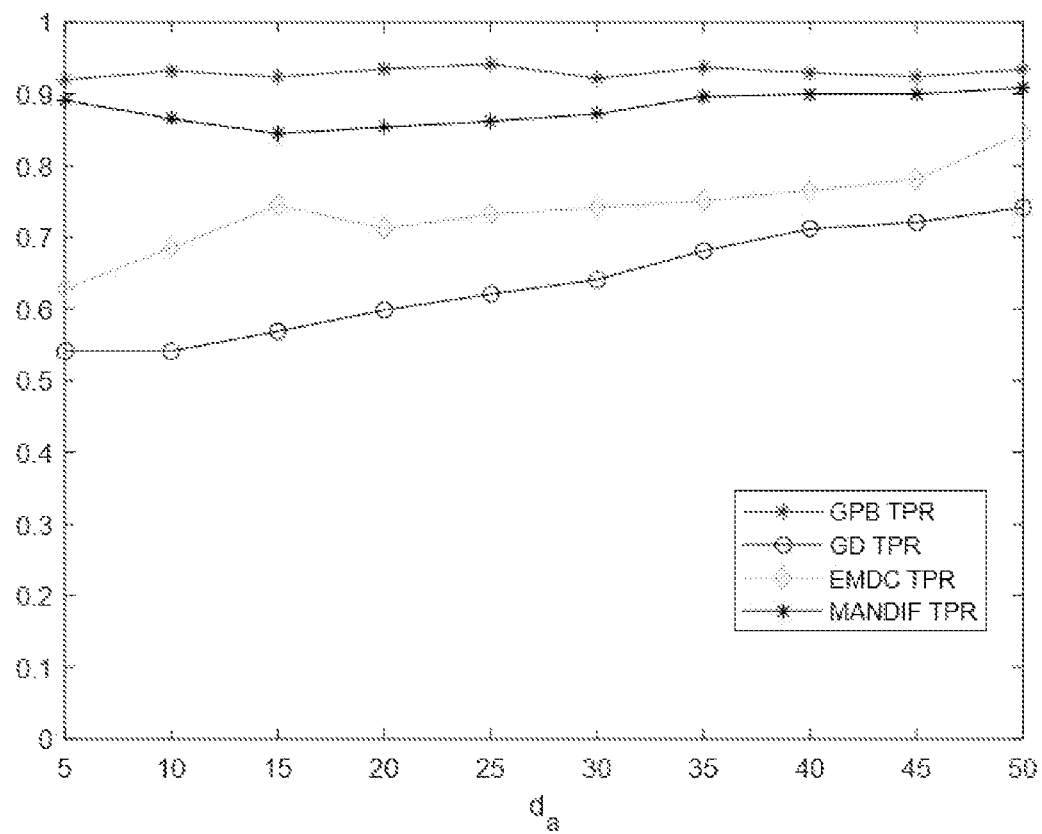
FIG. 4 shows curves of TPR (True Positive Rate) vs. attack term standard deviation according to an embodiment.
Figure 5:
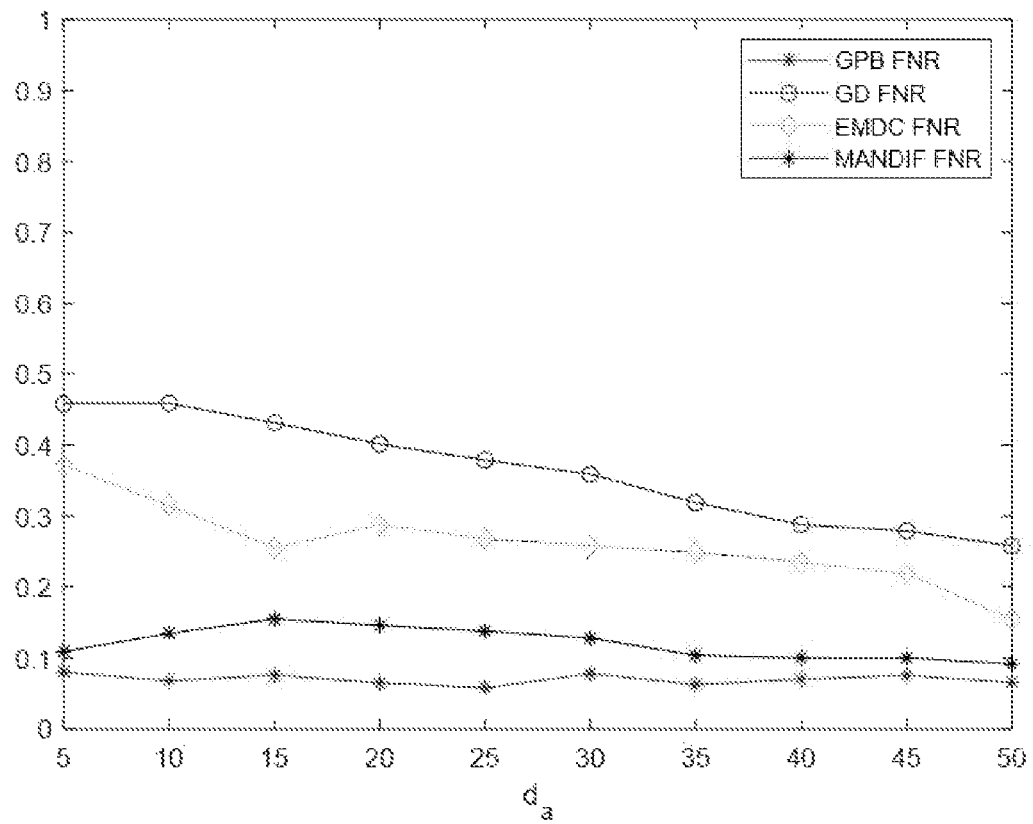
FIG. 5 shows curves of FPR (False Positive Rate) vs. attack term standard deviation according to an embodiment.

The FNR, TPR and FPR curves of the compared algorithms are shown in FIG. 3, FIG. 4, and FIG. 5, respectively. In this case, the traditional MNDC method is used to achieve malicious anchor detection and secure localization. There is an important prerequisite for implementing the method in EMDC: ensuring that the RSSI measurement values are not attacked while ToA measurement values are not attacked. In actual attacks, it is difficult to ensure this prerequisite; as the environmental attacks become more violent and the detection interval increases, the FPR becomes lower. However, GPB keeps the FPR below 0.0699 and the TPR above 0.9200, and performs well in both the intense attack environment and the mild attack environment. Since the method described in this embodiment is not affected by the value of the non-zero term, the algorithm achieves stable and excellent performance.

Then, the case where attacks are more violent and malicious anchor nodes account for a higher proportion is considered. As long as the number of malicious anchor nodes $$M \leq \frac{N-2}{2},$$

the target node localization and identification time of all malicious anchors can be achieved simultaneously. The proportion of malicious anchor nodes is set to 40%, and the same as Experiment 1, benign anchor nodes and malicious anchor nodes are randomly deployed in a 100 m×100 m area.

Figure 6:
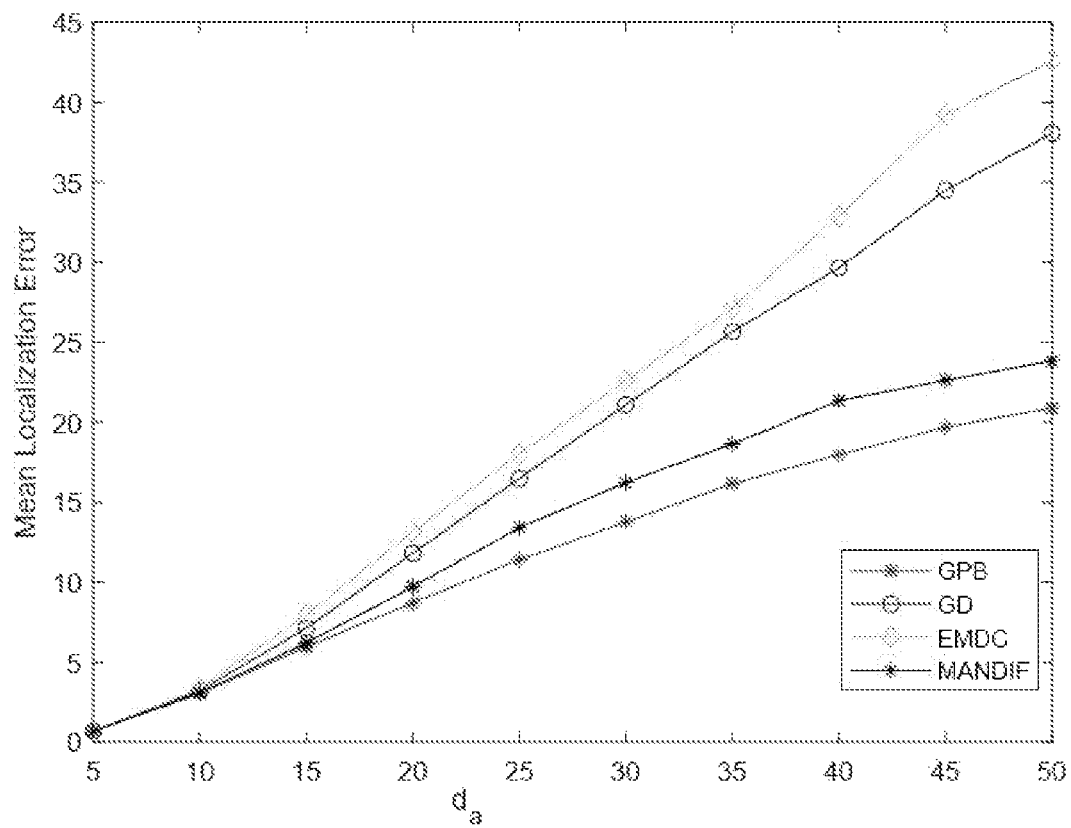
FIG. 6 shows curves of localization error vs. $d_a$ according to an embodiment.

The MLE is shown in FIG. 6. It can be seen from the figure that the mean localization errors of EMDC, GD, MANDIF and GPB are 20.78, 18.84, 13.59 and 11.82, respectively in the value range of $d_a$. The localization accuracy of the compared algorithms decreases; while the localization accuracy is maintained, the mean localization error decreases by 43.1%, 37.2%, and 13.0% compared to the EMDC, GD, and MANDIF algorithms, respectively.

Figure 7:
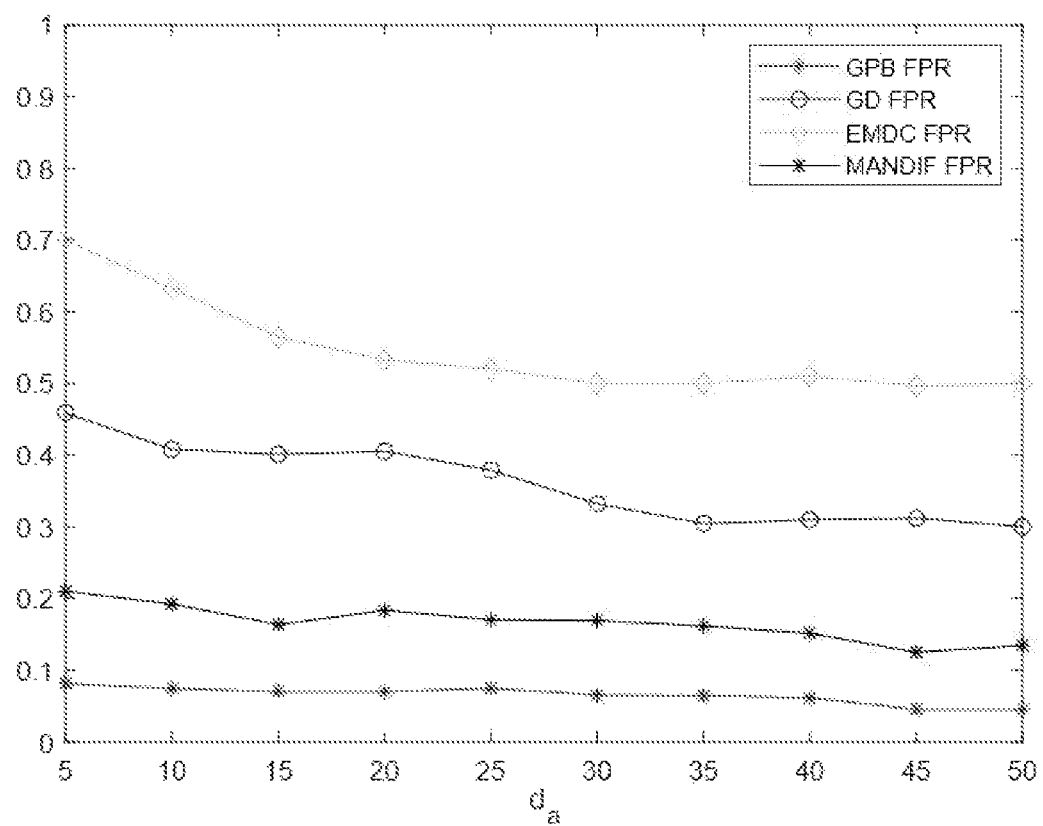
FIG. 7 shows curves of FPR vs. attack term standard deviation according to an embodiment.
Figure 8:
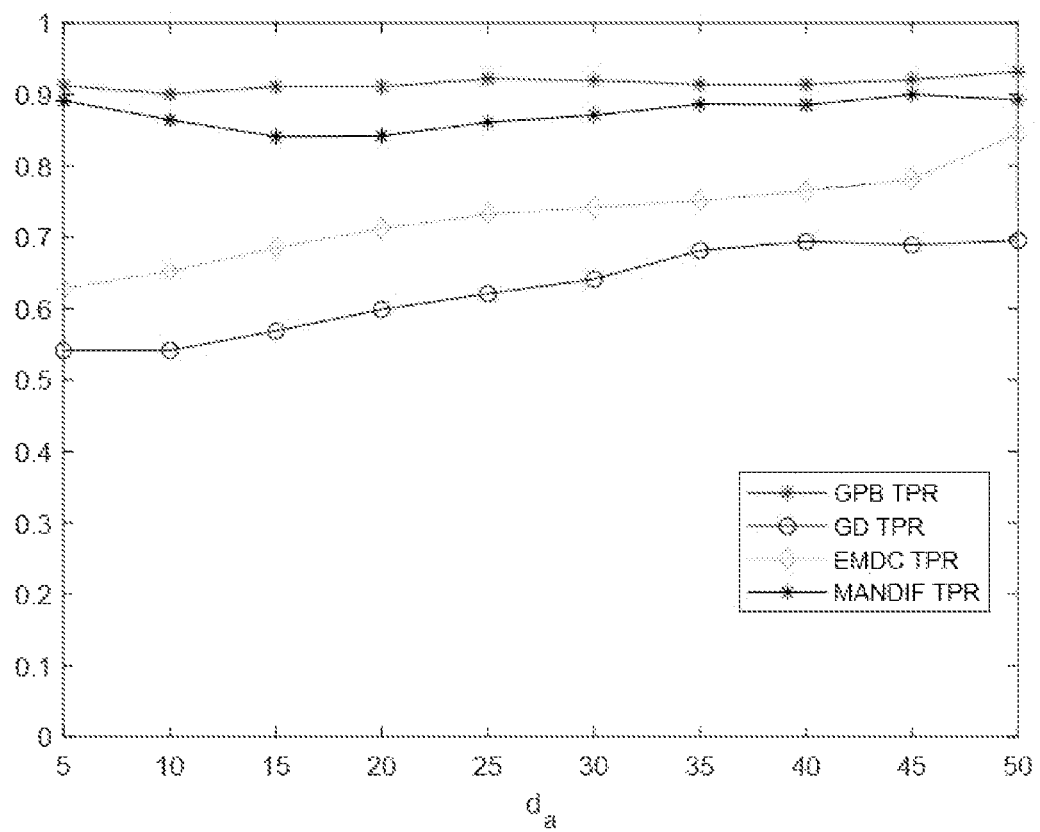
FIG. 8 shows curves of TPR vs. attack term standard deviation according to an embodiment.
Figure 9:
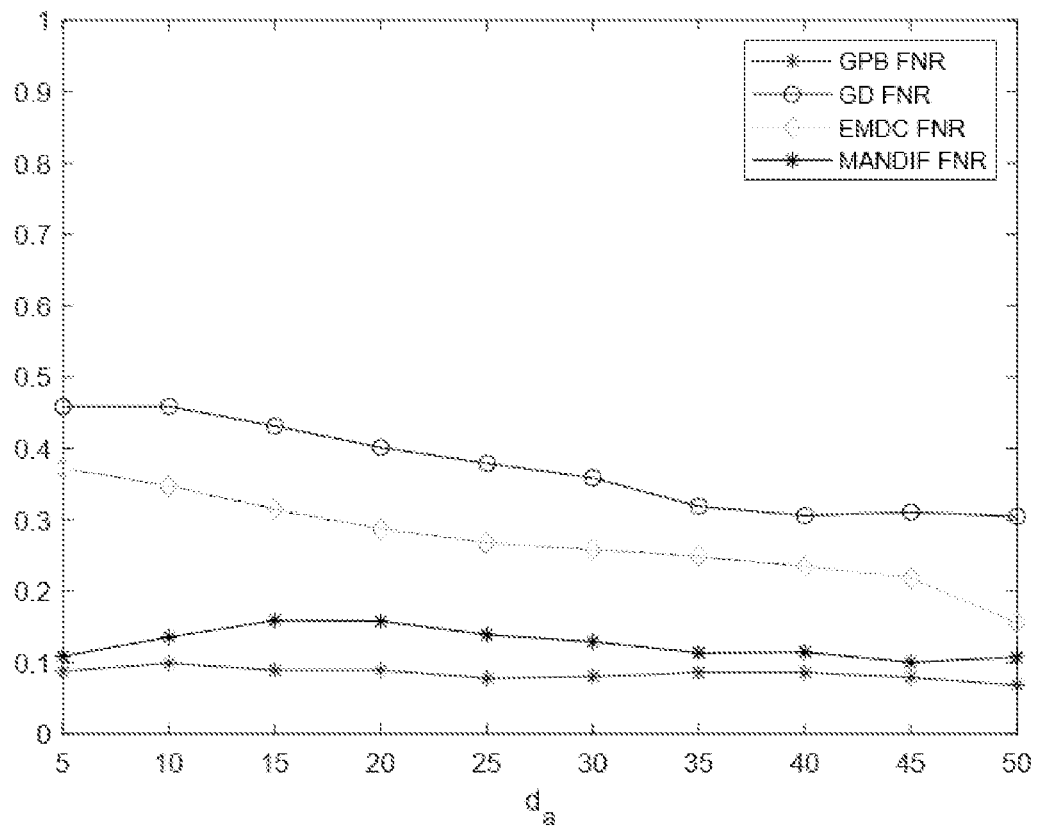
FIG. 9 shows curves of FNR vs. attack term standard deviation according to an embodiment.

The FPR, TPR, and FNR curves of the compared algorithms are given in FIG. 7, FIG. 8, and FIG. 9, respectively. The performance of the method described in this embodiment is that the FPR is kept below 0.0812 and the TPR is kept above 0.9010, and the performance is better than other algorithms.

It is apparent that the above embodiments are merely intended to describe the present disclosure clearly, rather than to limit the implementations of the present disclosure. The person of ordinary skill in the art may make modifications or variations in other forms based on the above description. There are no need and no way to exhaust all the embodiments. Any modification, equivalent replacement and improvement made within the spirit and principle of the present disclosure shall be included in the protection scope of the claims of the present disclosure.

What is claimed is:

1. A malicious anchor node detection and target node localization method based on recovery of sparse terms, comprising the following steps:
   S1: establishing an unknown disturbance term by using ranging value attack terms from an attacker to nodes in a wireless sensor network, and introducing a to-be-estimated location of a target node to the unknown disturbance term, to obtain an unknown sparse vector;
   S2: converting a problem of malicious anchor node detection and target node localization into a problem of recovery of the unknown sparse vector;
   S3: determining a location of an initial node according to a recursive weighted linear least square method, and recovering and reconstructing the unknown sparse vector with sparsity by using a self-adaptive gradient projection method; and
   S4: determining a malicious anchor node determination range by approximating a threshold using a recovered value of the unknown sparse vector, to implement malicious anchor node detection, and recovering and determining location information of the target node by using a non-sparse part reconstructed from an interference term.

2. The method according to claim 1, wherein according to a wireless sensor distribution model, in a network environment in which the sensor network is deployed, a location information set $\{A_1, A_2 \ldots A_n\}$ of anchor nodes in the network is set, and a node is randomly set as a target anchor node, wherein a location of the target anchor node is $t=[t_x, t_y]$, and a real distance between an i-th anchor node and the target node is $\|A_i-t\|$, $i=1, 2 \ldots n$; therefore, a measured distance $d_i$ between the i-th anchor node and the target node is expressed as follows:

$$d_i = \|A_i - t\| + n_i + u_i, i=1,2 \ldots n \quad (1)$$

wherein $n_i$ represents noise in a measurement process, which is a Gaussian random variable having an independent distribution with a mean of 0; $u_i$ represents the unknown disturbance term, which is represented by a Gaussian random variable having an independent distribution and is expressed as follows:

$$u_i \sim N(\mu_{att}, \sigma_{att}^2)$$

wherein $i=1,2, \ldots n$ and represents the i-th node; $\mu_{att}$ represents a mean, $\sigma_{att}^2$ represents a variance; and if the i-th node is a malicious anchor node, $u_i$ is a non-zero value, otherwise, $u_i$ is zero or close to zero.

3. The method according to claim 1, wherein the unknown sparse vector is expressed as follows:

$$p=[u_1, u_2, \ldots u_n, t_x, t_y]$$

wherein $u_i$ represents the unknown disturbance term, $i=1,2, \ldots, n$; $t=[t_x, t_y]$ and represents the to-be-estimated location of the target node.

4. The method according to claim 3, wherein step S2 of converting a problem of malicious anchor node detection and target node localization into a problem of recovery of the sparse vector is expressed as follows:

$$\hat{p} = \underset{p}{\operatorname{argmin}} G(P) = \operatorname{argmin} \sum (d_i - \|A - t\|_2 + u_i)^2 + \lambda \|u\|_1 \quad (2)$$

wherein $d_i$ represents an estimated distance value of the malicious anchor node when there is a measurement error; A represents a coefficient matrix, $\lambda$ represents a regular factor, and u represents an attack term.

5. The method according to claim 4, wherein because the recovery and reconstruction of the unknown sparse vector rely on the location of the initial node, a signal energy receiving model is established according to a signal energy loss and a distance relationship between a transmitting end and a receiving end, and a linear system model is established according to the signal energy receiving model and solved by using a recursive weighted linear least square method, thereby determining the location of the initial node.

6. The method according to claim 5, wherein the signal energy receiving model is expressed as follows:

$$P_R = P_{Ti} - 10\alpha \log \frac{d_i}{d_o} + \varepsilon_i \quad (3)$$

wherein $P_R$ represents signal energy received by an i-th receiving end from the target anchor node; $P_{Ti}$ represents initial signal energy sent by an i-th transmitting end, $d_i$ is a measured distance between an i-th anchor node and the target node, $d_0$ is a reference distance, and $\varepsilon_i$ is a measurement error;

formula (2) is converted into the following form:

$$z_i = 10^{y_i}, i=1,2, \ldots n \quad (4)$$

wherein $$z_i = 10\frac{P_{Ti} - P_R}{10a}, \; y_i = \log d_i + \frac{\varepsilon_i}{5a};$$

α represents a channel attenuation coefficient;

after unscented transformation and mathematical operations, a mean and a variance of $Z_i$ are obtained approximately:

$$\bar{Z}_i \approx \alpha_i \|A_i - T\|^2 \quad (5)$$

$$\sigma_{z_i}^2 = \beta_i \|A_i - T\|^2 \quad (6)$$

wherein $$\alpha_i = \frac{2}{3} + \frac{1}{6} 10^{\frac{\sqrt{3}\sigma_i^2}{5a}} + \frac{1}{6} 10^{-\frac{\sqrt{3}\sigma_i^2}{5a}}, \text{ and}$$

$$\beta_i = \frac{2}{3}(1-\alpha_i)^2 + \left(10^{\frac{\sqrt{3}\sigma_i^2}{5a}} - \alpha_i\right)^2 + \frac{1}{6}\left(10^{-\frac{\sqrt{3}\sigma_i^2}{5a}} - \alpha_i\right)^2.$$

7. The method according to claim 6, wherein the established linear system model is expressed as follows:

$$b = At + w \quad (7)$$

wherein $t = [t_x, t_y]$ represents the to-be-estimated location of the target node, w is a noise vector, $w = [\omega_1, \omega_2 \ldots \omega_n]^T$, and $\omega_i$ represents Gaussian white noise with a mean of 0; i=1, 2 ... n;

b represents an observation vector:

$$b = [b_1, b_2, \ldots b_n]^T = \begin{bmatrix} \frac{z_1}{\alpha_1} - \frac{z_r}{\alpha_r} + (x_r^2 + y_r^2) - (x_1^2 + y_1^2) \\ \frac{z_2}{\alpha_2} - \frac{z_r}{\alpha_r} + (x_r^2 + y_r^2) - (x_2^2 + y_2^2) \\ \ldots \\ \frac{z_n}{\alpha_n} - \frac{z_r}{\alpha_r} + (x_r^2 + y_r^2) - (x_n^2 + y_n^2) \end{bmatrix} \quad (8)$$

wherein $(x_r, y_r)$ represents location information of a r-th anchor node, and the r-th anchor node is selected as a reference anchor node;

A represents a coefficient matrix, $$A = 2 \begin{bmatrix} x_r - x_1 & y_r - y_1 \\ x_r - x_2 & y_r - y_2 \\ \vdots & \vdots \\ x_r - x_n & y_r - y_n \end{bmatrix} \quad (9)$$

then a weighted linear least square equation and a corresponding solution are expressed as follows:

$$f(t) = (b - At)^T * c(t)^{-1} * (b - At) \quad (10)$$

$$\hat{t} = [A^T c(\hat{t})^{-1} A]^{-1} A^T c(\hat{t})^{-1} b \quad (11).$$

8. The method according to claim 7, wherein to achieve higher computing accuracy, a backtracking equation is acquired through iterative solutions, $$\hat{t}^k = [A^T c(\hat{t})^{-1} A]^{-1} A^T c(\hat{t}^{k-1})^{-1} b \quad (12)$$

wherein an iteration ending condition is: $\|\hat{t}^k - \hat{t}^{k+1}\| \leq \gamma$, and γ represents a threshold of a Euclidean distance between location information of the k-th iteration threshold of a Euclidean distance between location information of a k-th iteration result and location information of a (k+1)-th iteration result, and is set manually.

9. The method according to claim 8, wherein the unknown sparse vector is recovered by using the self-adaptive gradient projection method, two positive vectors $\phi = [\phi_1, \phi_2, \ldots, \phi_n]^T$ and $\tau = [\phi^T, \psi^T, t^T]^T$ are introduced first to divide the unknown sparse vector into a positive part and a negative part, thereby dividing G(P) into a loss function and a regular function;

$\tau = [\phi^T, \psi^T, t^T]^T$ is redefined in the recovery process, and then formula (2) is converted into the following form:

$$\hat{p} = \underset{p}{\operatorname{argmin}} G(P) = \underset{p}{\operatorname{argmin}} \sum (d_i - \|A - t\|_2 + u_i)^2 + \lambda 1_N^T(\phi + \psi) \quad (13)$$

wherein $P = [u_1, u_2 \ldots u_n, t_x, t_y]$;

an iterative formula is as follows:

$$\begin{cases} v^k = P(\tau^k - \alpha^k \nabla G(\tau^k)) \\ \tau^{k+1} = \tau^k + \lambda^k(v^k - \tau^k) \end{cases} \quad (14)$$

wherein in formula (14), $\tau^k$ is the k-th iteration result of $\tau = [\phi^T, \psi^T, t^T]^T$; $\alpha^k$ represents an adaptive step; $\lambda^k$ represents a positive scalar; P( ) is used to represent a projection operation for vector z.

10. The method according to claim 9, wherein iterations are performed on iterative formula (14) according to an Armijo rule, that is, all values of k are set to 1 by using $\lambda^k$, and then $\alpha^k$ is continuously reduced until an Armijo-like inequation is satisfied, wherein the Armijo-like inequation is expressed as follows:

$$G(P(\tau^k - \alpha^k \nabla G(\tau^k))) \leq \mu \nabla G(\tau^k)^T (\tau^k - P(\tau^k - \alpha^k \nabla G(\tau^k))) \quad (15)$$

wherein $\beta \in (0, 0.5)$, $\alpha \in (1, 2)$, and after a value of the adaptive step is fixed, $\tau^k = P(\tau^k - \alpha^k \nabla G(\tau^k))$ is determined.

\* \* \* \* \*